United States Patent
Hirato et al.

(10) Patent No.: US 7,495,739 B2
(45) Date of Patent: Feb. 24, 2009

(54) LIQUID CRYSTAL DISPLAY DEVICE AND METHOD OF MANUFACTURING THE LIQUID CRYSTAL DISPLAY

(75) Inventors: Shinichi Hirato, Mie (JP); Naoshi Yamada, Mie (JP); Hidetomo Miyake, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

(21) Appl. No.: 10/561,979

(22) PCT Filed: Jun. 23, 2004

(86) PCT No.: PCT/IB2004/002536

§ 371 (c)(1),
(2), (4) Date: Apr. 19, 2006

(87) PCT Pub. No.: WO2005/006067

PCT Pub. Date: Jan. 20, 2005

(65) Prior Publication Data

US 2006/0238692 A1    Oct. 26, 2006

(30) Foreign Application Priority Data

Jun. 23, 2003    (JP) .............................. 2003-178036

(51) Int. Cl.
*G02F 1/1339*    (2006.01)

(52) U.S. Cl. .................. 349/155; 349/156; 349/157
(58) Field of Classification Search ................ 349/155, 349/156, 157
See application file for complete search history.

(56) References Cited

FOREIGN PATENT DOCUMENTS

| JP | 8-254682 | A | * | 10/1996 |
|----|----------|---|---|---------|
| JP | 9-258230 | A | * | 10/1997 |
| JP | 11-002808 |   | * | 1/1999 |
| JP | 11-2808 | A |   | 1/1999 |
| JP | 2968987 | B2 |   | 8/1999 |
| JP | 09120074 | A | * | 8/1999 |
| JP | 11352322 | A | * | 12/1999 |
| JP | 2002-162632 | A | * | 6/2002 |
| JP | 2003-66461 | A |   | 3/2003 |

* cited by examiner

*Primary Examiner*—K. Cyrus Kianni
(74) *Attorney, Agent, or Firm*—Nixon & Vanderhye, P.C.

(57) ABSTRACT

It is an object of the present invention to provide a liquid crystal display device in which areas of spacers can be reduced while securing sufficient strength of columns. In the liquid crystal device according to the invention with liquid crystal held between substrates of a pair and spacers (24) for keeping a gap between the substrates of the pair and provided between the substrates, each of the spacers (24) includes a first layer (24a) laminated over the substrate and a second layer (24b) disposed over the first layer (24a) to cross the first layer (24a) in a plan view.

20 Claims, 10 Drawing Sheets

LIQUID CRYSTAL DISPLAY DEVICE AND METHOD OF MANUFACTURING THE LIQUID CRYSTAL DISPLAY

This application is the U.S. national phase of international application PCT/IB2004/002536, filed 23 Jun. 2004, which designated the U.S. and claims priority of JP 2003-178036, filed 23 Jun. 2003, the entire contents of each of which are hereby incorporated by reference.

BACKGROUND OF THE INVENTION

1. Field of the Invention

The present invention relates to a liquid crystal display device and a method of manufacturing the same.

2. Description of the Related Art

A typically employed liquid crystal display device is constructed by bonding two substrates on which an electrode pattern and an oriented film are formed by utilizing sealing resin or a setting property of UV resin. Various attempts have been made in order to maintain a space between the pair of upper and lower substrates, such as plastic bead spacers of a predetermined diameter provided between the substrates or a plurality of columnar spacers formed between the substrates.

In the latter case in which the columnar spacers are formed, there is a method in which a resist exclusive to the spacers is used. There is also disclosed a method in which colored layers 24a' 24b' are layered to form a columnar spacer 24' as shown in FIG. 8A.

Properly speaking, in order to form the columnar spacer 24' by layering the colored layers 24a', 24b', the colored layers 24a', 24b' have to be layered accurately as shown in FIG. 8A. However, due to a problem in exposure accuracy and the like, a sufficient overlap between colors may not be obtained in some cases as shown in FIGS. 8B and 8C. If the sufficient overlap cannot be obtained in this manner, an overlap area of the column differs to cause variations in column strengths and unevenness of a gap.

With the above problems in view, in order to obtain a sufficient overlap area between colors, setting a pattern of a lower colored layer 24a' in a size based on exposure accuracy as shown in FIGS. 9A and 9B. In the drawing, a designates a maximum value of the sum of the exposure accuracies of the two layers 24a', 24b'. In this case, even if the layers are displaced from each other as shown in FIG. 9C, the overlap area does not change. Therefore, the column strength does not change and display unevenness due to the unevenness of the gap is not caused either. Moreover, in order to secure a sufficient height of the column, three layers 24a', 24b', and 24c' may be layered as shown in FIG. 10. In the drawing, α1 and α2 designate maximum values of the sum of exposure accuracies of two layers, respectively. As the same kind of method, there is art described in Japanese Patent Application Laid-open No. H09-120074, where a column is not square but circular unlike the columns shown in FIGS. 9A to 10 but the purpose is the same.

However, in the spacers in FIGS. 9A to 9C and 10 and H09-120074, an increase in an area of the lowermost layer 24a' is absolutely necessary. As a result, the spacer requires a larger area in a pixel of a liquid crystal display element and a numerical aperture of the pixel may be reduced to cause a reduction in a transmittance.

SUMMARY OF THE INVENTION

Therefore, the present invention has been made with the above problems in view and it is an object of the invention to provide a liquid crystal display device in which areas of spacers can be reduced while securing sufficient strength of columns.

To achieve the above problems, a liquid crystal display device according to the present invention is such that a liquid crystal display device with liquid crystal held between a pair of substrates and spacers for keeping a gap between the substrates of the pair provided between the substrates, wherein each of the spacers includes a first layer laminated over one of the substrates and a second layer disposed over the first layer to cross the first layer in a plan view.

In the liquid crystal display device according to the present invention and having the above structure, even if the layer is displaced slightly from a position where the layer is desired to be formed due to a problem in exposure accuracy, for example, in forming the first layer or the second layer, an area of the overlap between both the layers is constant, because the first layer and the second layer are disposed to cross each other in the plan view. Therefore, it is possible to prevent variations in the column strengths and the unevenness of the gap. Moreover, as compared with the prior-art spacers (in FIGS. 9A to 9C, 10, the Patent Document 1, and the like), an area required by each of the spacers can be reduced to thereby reduce a loss of a numerical aperture. In other words, in the prior-art spacer, one of the layers (lower layer in FIGS. 9A to 9C) need be enlarged in surrounding eight directions, i.e., front, rear, left, right, and diagonal directions from a position where the two layers are expected to overlap (hereinafter referred to as a "desired overlap position" in some cases). According to the present invention, forming two layers each of which extending in two directions from the desired overlap position suffices and the area required by the spacer can be reduced.

In the present invention, a condition that the first layer is laminated over the substrate is satisfied if only the first layer is formed on the other substrate side of one of the substrates and a condition that the second layer is formed over the first layer is satisfied if only the second layer is formed closer to the other substrate than the first layer. It is not essential that the second layer be formed directly on the first layer.

According to the present invention, in a method of manufacturing a liquid crystal display device with spacers for keeping a gap provided between a pair of substrates and liquid crystal held between the substrates, formation of the spacers includes the steps of providing a first layer laminated over one of the substrates, and providing a second layer disposed over the first layer to cross the first layer in a plan view.

With the manufacturing method having the above structure, the above-described liquid crystal display device of the present invention can be manufactured and there are similar advantages to the above advantages. In other words, even if the layer is displaced slightly from a position where the layer is desired to be formed in forming the first layer or the second layer, an area of the overlap between both the layers is constant. Therefore, it is possible to prevent variations in the column strengths and the unevenness of the gap and to reduce a loss of the numerical aperture.

Further, in the liquid crystal display device according to the present invention, it is preferable that at least one of the layers constituting the spacers is a resin layer. It is also preferable, in the manufacturing method according to the present invention, at least one of the layers constituting the spacers is a resin layer. In other words, if the layer is formed of a layer forming a color filter as the resin layer, for example, the whole or the part of the spacer can be formed simultaneously in the step of forming the color filter layer. If the layer is formed of a layer of a structure for alignment of the liquid crystal as the resin layer, the whole or the part of the spacer can be formed simultaneously in the step of lamination of the structure to thereby reduce the number of steps of forming the spacer.

In the liquid crystal display device according to the present invention, it is preferable to employ a structure in which a color filter layer is provided between the substrates of the pair and at least one of the layers constituting the spacers is formed when forming the color filter layer. As a result, the whole or the part of the spacer can be formed simultaneously in forming the color filter layer to thereby reduce the number of steps of forming the spacer.

Likewise, in the manufacturing method according to the present invention, it is preferable that the formation of the spacers further includes the step of providing a color filter layer between the substrates of the pair, and at least one of the layers constituting the spacers is formed in the step of forming the color filter layer.

Moreover, in the liquid crystal display device according to the present invention, although a transparent electrode may be formed on an upper face of the second layer formed over the first layer, it is preferable that the transparent electrode layer is formed between the first layer and the second layer. Thus, the transparent electrode is positioned under the second layer to thereby prevent the transparent electrode from coming in contact with a transparent electrode formed on the other substrate. In other words, the second layer can function as an insulating layer for the overlap.

In the manufacturing method according to the present invention, it is preferable that the formation of the spacers further includes the step of forming a transparent electrode layer between the step of forming the first layer and the step of forming the second layer. Thus, the invention has advantages similar to the above described method.

In the liquid crystal display device according to the present invention, it is preferable that both of the first layer and second layer are formed by exposure and development, and a length of one of portions extending off an overlap between the first layer and the second layer is set to be equal to or greater than the sum of exposure accuracies and development accuracies of the respective layers. As a result, even if both the first layer and the second layer formed while exposures and developments of both the layers are displaced in the same direction in forming both the layers, the constant area of the overlap between the first layer and the second layer can be obtained.

In the manufacturing method according to the present invention, it is preferable to employ a structure in which both of the first layer and second layer are formed by exposure and development, and a length of one of portions extending off an overlap between the first layer and the second layer is set to be equal to or greater than the sum of exposure accuracies and development accuracies of the respective layers in forming the first and second layers. Thus, the invention has the similar advantages to the above described method.

BRIEF DESCRIPTION OF THE DRAWINGS

FIGS. 2A and 2B are schematic explanatory views of the second substrate of the liquid crystal display device of the embodiment, in which FIG. 2A is a plan view and FIG. 2B is a sectional view.

FIGS. 3A and 3B are schematic explanatory views of the second substrate of the liquid crystal display device of the embodiment, in which FIG. 3A is a plan view and FIG. 3B is a sectional view.

FIGS. 8A, 8B, and 8C are schematic explanatory views of a second substrate of a prior-art liquid crystal display device, in which FIG. 8A is a side view, FIG. 8B is a plan view of a case where a displacement occurs, and FIG. 8C is a side view of a case where a displacement occurs.

FIGS. 9A, 9B, and 9C are schematic explanatory views of a second substrate of a prior-art liquid crystal display device, in which FIG. 9A is a side view, FIG. 9B is a plan view, and FIG. 9C is a side view of a case where a displacement occurs.

DETAILED DESCRIPTION OF PREFERRED EMBODIMENTS

Figure 1:
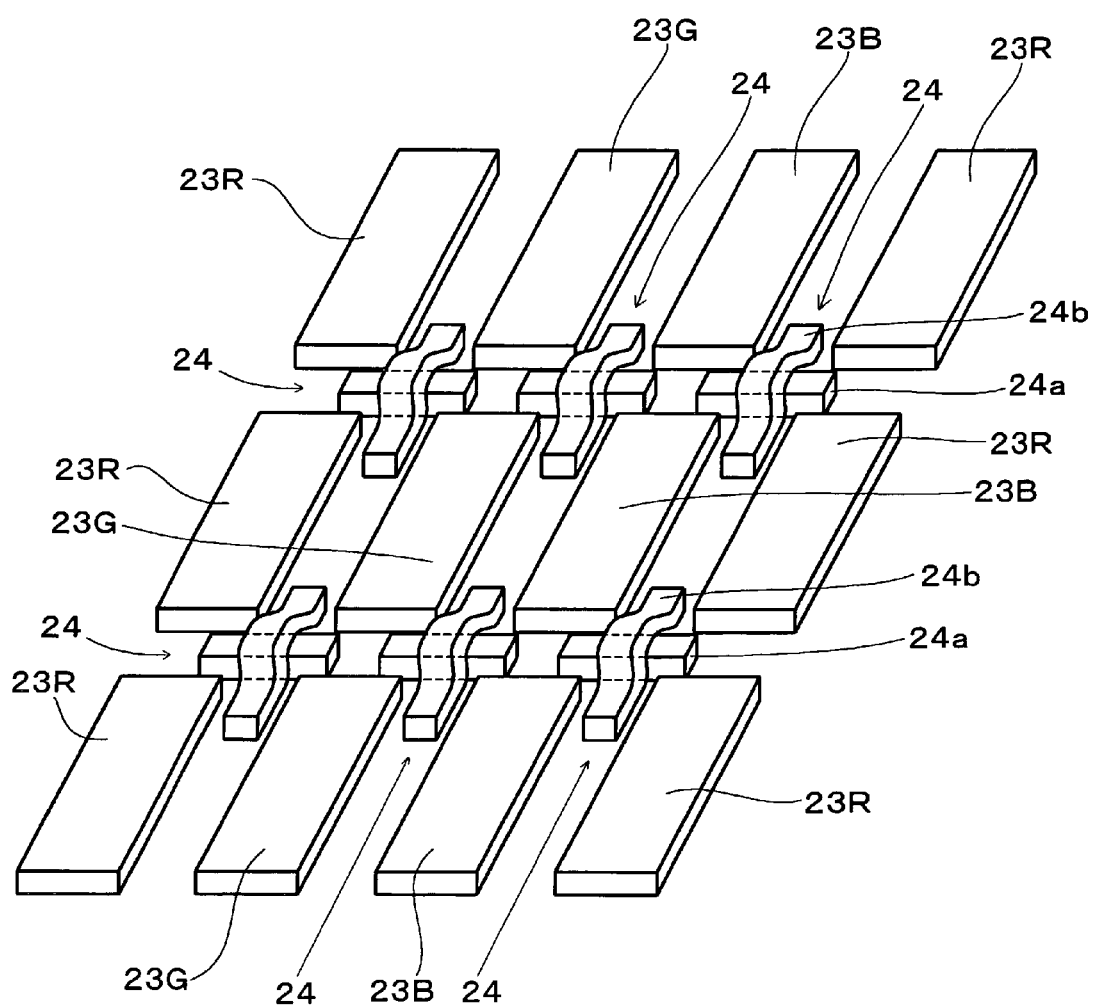
FIG. 1 is a schematic perspective view of a second substrate of a liquid crystal display device of an embodiment of the present invention.
Figure 2:
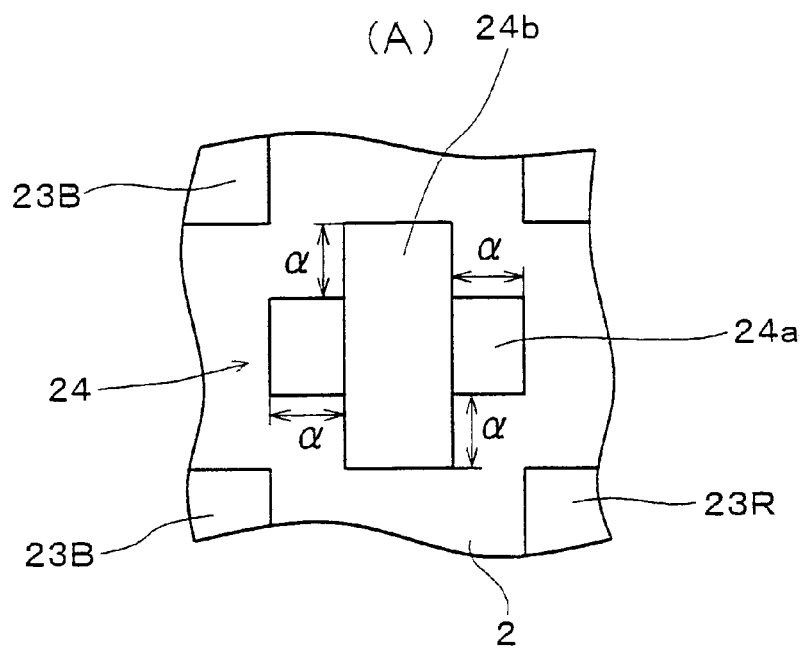
Figure 2:
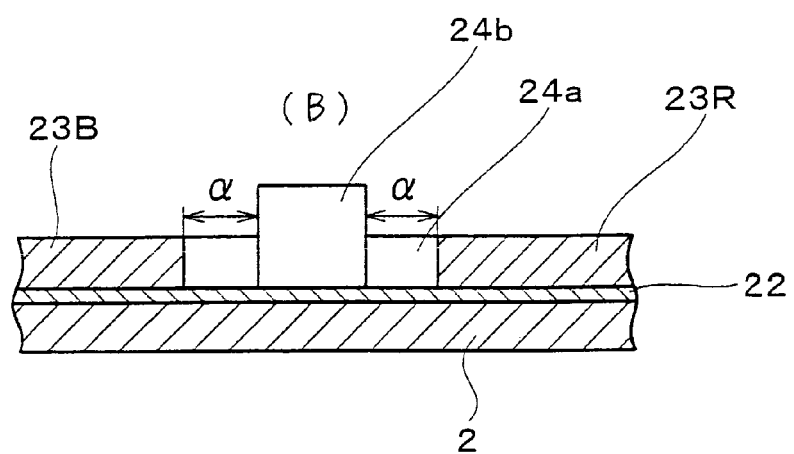
Figure 3:
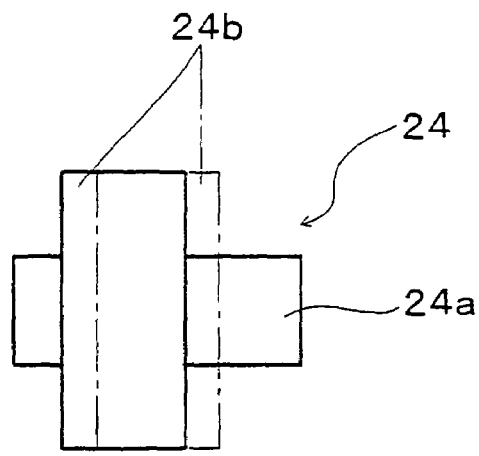
Figure 3:
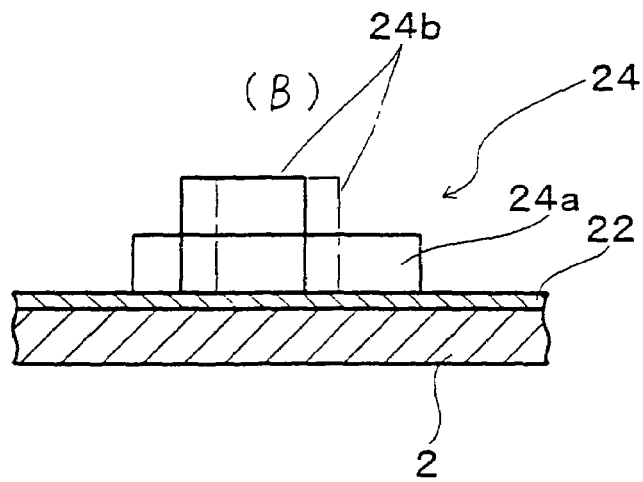
Figure 4:
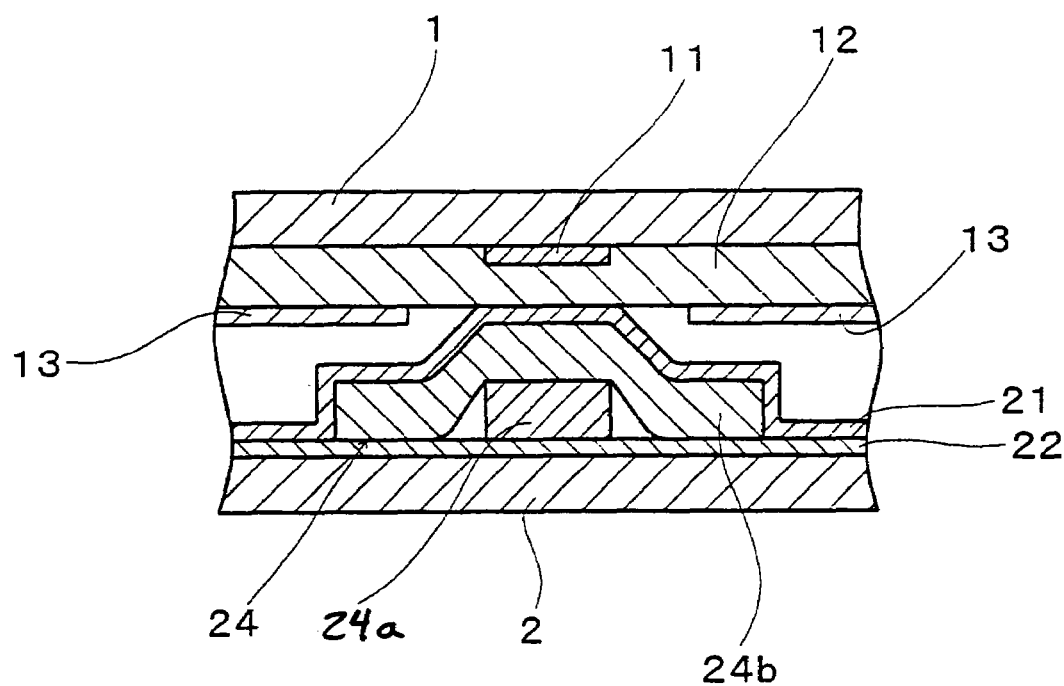
FIG. 4 is a schematic sectional view of the liquid crystal display device of the embodiment.
Figure 5:
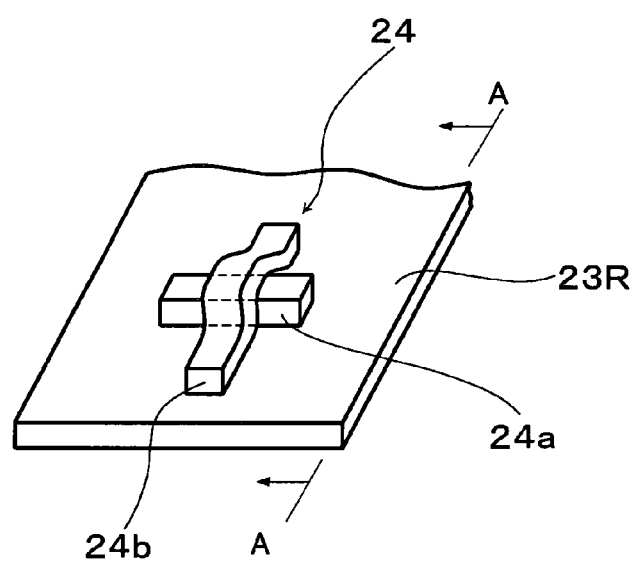
FIG. 5 is a schematic perspective view of a second substrate of a liquid crystal display device of another embodiment of the present invention.
Figure 6:
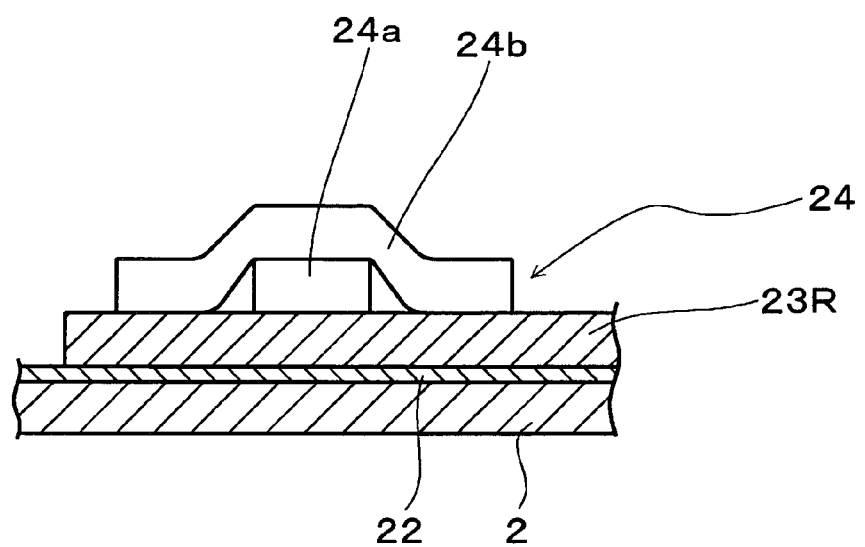
FIG. 6 is a sectional view taken in a direction of an arrow A-A in FIG. 5.
Figure 7:
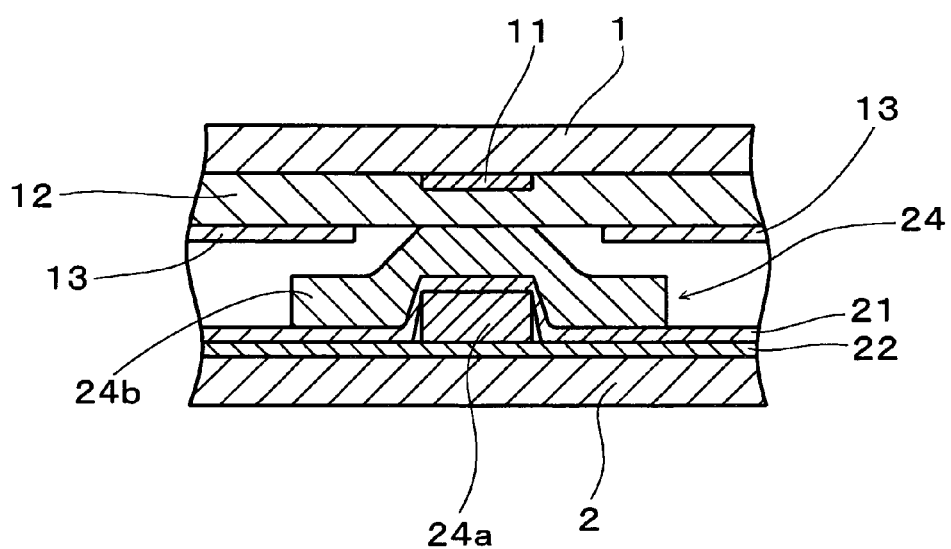
FIG. 7 is a schematic sectional view of a liquid crystal display device of another embodiment of the present invention.
Figure 8:
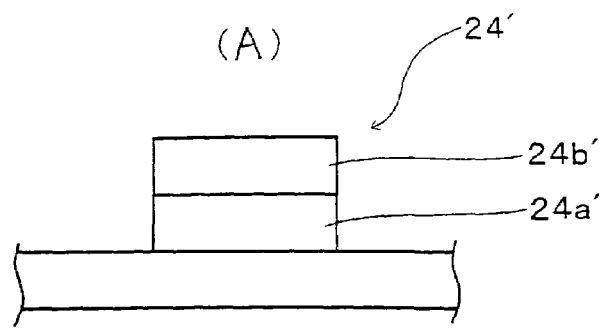
Figure 8:
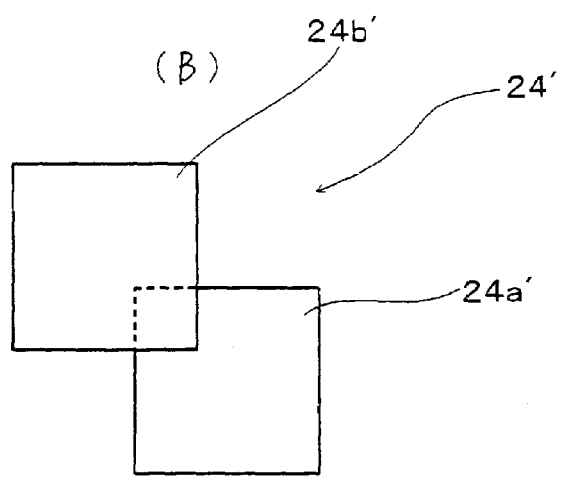
Figure 8:
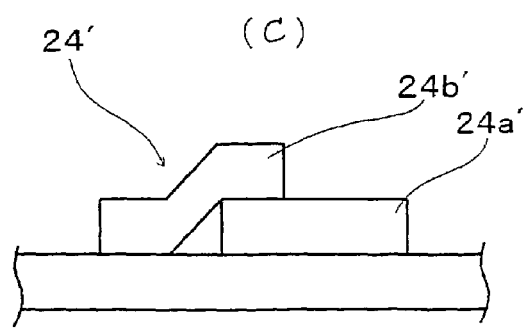
Figure 9:
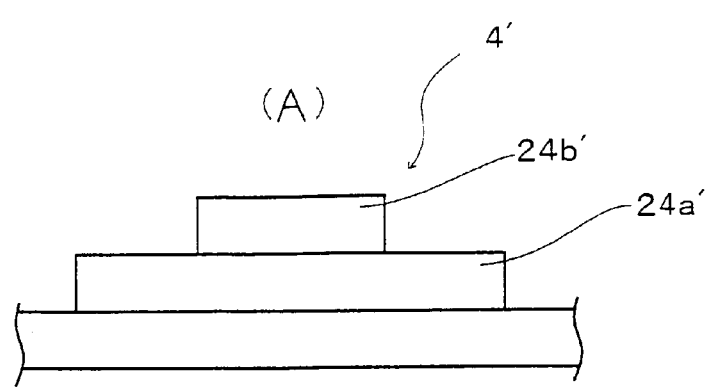
Figure 9:
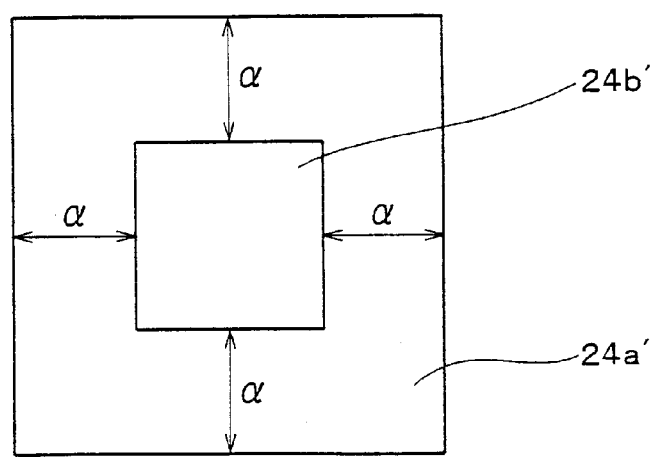
Figure 9:
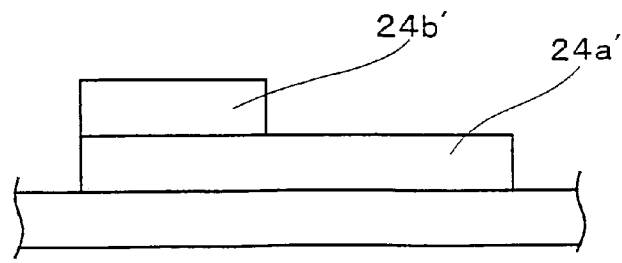
Figure 10:
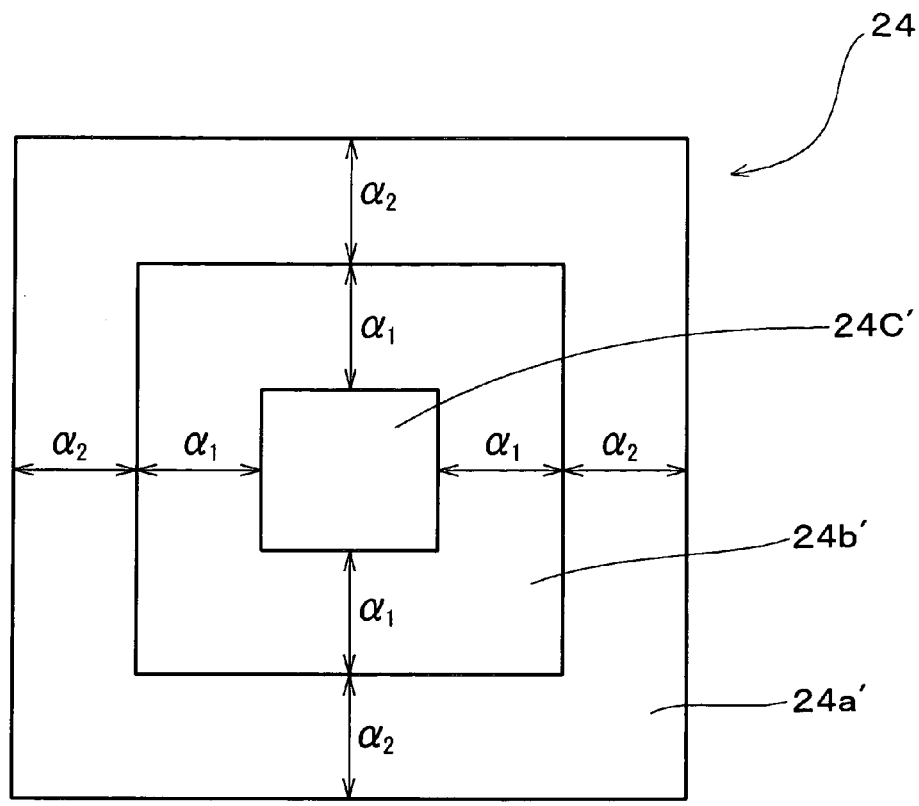
FIG. 10 is a schematic plan view of a second substrate of a prior-art liquid crystal display device.

As an example of a liquid crystal display device according to the present invention, an active matrix (hereinafter referred to as AM) type liquid crystal display device will be described below by reference to the drawings. FIG. 1 is a schematic perspective view of a second substrate and does not show a common electrode. FIGS. 2A to 3B are schematic explanatory views of the second substrate, respectively, in which FIGS. 2A and 3A are plan views and FIGS. 2B and 3B are sectional views. FIGS. 2A and 2B show a first layer and a second layer which are layered in an ideal manner. FIGS. 3A and 3B show the first layer and the second layer displaced from each other due to exposure accuracy. FIG. 4 is a schematic sectional view of the liquid crystal display device of the embodiment and does not show a TFT, a scanning electrode, and an oriented film. FIGS. 5 and 6 are explanatory views of another embodiment of the liquid crystal display device according to the present invention. FIG. 5 is a schematic perspective view of a second substrate and FIG. 6 is a sectional view taken in a direction of an arrow A-A. In any of the drawings, the common electrode is not shown. FIG. 7 is a schematic sectional view of another embodiment and does not show the TFT, scanning electrode, and oriented film.

First, a schematic structure of a general AM type liquid crystal display element and an outline of a method of manufacturing the element will be described. Formed on a first substrate 1 are a signal electrode 11 and its terminals, an interlayer insulating film 12, a scanning electrode and its terminals, a TFT (thin-film transistor), a plurality of pixel electrodes 13, and a common electrode terminal. Formed on a second substrate 2 are a common electrode 21, a black matrix 22 (hereinafter referred to as "BM"), and color filter layers 23R, 23G, and 23B. Oriented films are respectively applied to the first substrate 1 and the second substrate 2, and the pair of the substrates 1 and 2 are bonded to each other with spacers provided between them so as to maintain a constant gap between them. In this bonding, the substrates are bonded to each other through a thermosetting seal or a photo-curing seal and the common electrode 21 is connected to the common electrode terminal on the first substrate 1 by using conductive paste or the like. Then, liquid crystal is filled by a vacuum filling method and a filling port is sealed with photo-curing sealing resin.

Each of the spacers 24 is formed on the second substrate 2, formed of two layers, i.e., a first layer 24a laminated on the substrate 2 and a second layer 24b disposed on the first layer 24a to be orthogonal to the first layer 24a in a plan view, and formed concurrently with forming of the color filter layers 23R, 23G in the present embodiment. Next, a specific example of this will be described by reference to FIGS. 1 and 2.

The color filter layers 23R, 23G, and 23B are formed on an upper face of the BM22 on an upper face of the substrate 2 and formed of red, green, and blue-colored resins arranged to correspond to pixels. Here, the respective colored resins are formed at certain intervals by mask-exposing respective photo-curing resists and then developing them with a predetermined developer.

The first layer 24a and the second layer 24b forming each of the spacers 24 is formed of the respective colored resin materials in forming the colored resins. In other words, in this embodiment, the first layer 24a is formed of the red-colored resin material simultaneously with lamination of the red-colored resin and the second layer 24b is formed of the green-colored resin material simultaneously with lamination of the green-colored resin. More specifically, the red-colored resins and the first layers 24a are formed by exposure and development on the substrate 2, the green-colored resins and the second layers 24b are formed by exposure and development on the substrate 2, and then the blue-colored resins are formed by exposure and development on the substrate 2 to thereby form the color filter layers 23R, 23G, and 23B and the spacers 24.

In the present embodiment, the spacers 24 are disposed in spaces between the respective colored resins 23R, 23G, and 23B, i.e., in positions corresponding to spaces between the pixel electrodes 13 on the other substrate 1 (first substrate 1) (where the interlayer insulating film 12 is exposed). The spacer 24 is formed in each space between the pixels in the example shown in the drawings, but the spacer may be formed in every third space between the pixels.

The first layer 24a and the second layer 24b forming each of the spacers 24 are formed in rectangular shapes in a plan view and their longitudinal sizes (lengths) are set so that each of portions α extending off the overlap equals the sum of exposure accuracies and development accuracies of the resists of the respective layers. To be concrete, the sizes are set by the following expression.

$$\alpha = (\text{exposure accuracy of } R) + (\text{development accuracy of } R) + (\text{exposure accuracy of } G) + (\text{development accuracy of } G)$$

Then, on the second substrate 2 formed with the color filter layers 23R, 23G, and 23B and the spacers 24 as described above, a transparent electrode (common electrode 21) is formed on an upper face of them. The pair of the substrates 1 and 2 are bonded to each other so that each of portions of the transparent electrode 21 laminated on the spacers 24 comes in contact with the space between the pixel electrodes 13 on the other substrate (first substrate 1) (where the interlayer insulating film 12 is exposed).

The present invention is not limited to the structure of the above embodiment but can be changed properly in design without departing from the scope intended by the present invention.

In other words, the spacer 24 formed of the red-colored resin and the green-colored resin has been described in the above embodiment, but the present invention is not limited to it. In forming the first layer 24a and the second layer 24b by using the colored resins, the layers may be formed of other colors, e.g., the green-colored resin and the blue-colored resin, as proper and feasible changes in design.

The first layer 24a and the second layer 24b are formed on the upper face of the BM22 in the above embodiment, but the first layer and the second layer may be laminated on the colored resin layers, for example, to thereby increase the gap between the substrates 1 and 2. To be concrete, by disposing the spacer 24 for every three pixels and forming the spacer 24 (24a, 24b) as described in the above embodiment at a portion of the colored resin layer 23R which is not used as the lamination spacer 24, for example, as shown in FIGS. 5 and 6, desired advantages of the present invention can be obtained without reducing the numerical aperture. In the example shown in FIGS. 4 and 5, the first layer 24a is formed of the green-colored resin material on the colored resin layer 23R formed of the red-colored resin material and the second layer 24b is formed of the blue-colored resin on the first layer 24a. Incidentally, the spacer 24 may be formed first and then the other colored resin may be laminated on an upper face of the spacer 24. To be concrete, the first layer 24a made of the red-colored resin material may be formed, the second layer 24b may be formed of the green-colored resin material on the first layer 24a, and the blue-colored rein may be laminated on the second layer 24b, for example.

It is also possible that an insulating layer is formed on the electrode 21 formed on an upper face of the second layer 24b of the spacer 24 described in the above embodiment. In this way, there is an advantage that the spacer 24 need not be formed in the space between the pixel electrodes on the interlayer insulating film 12.

Moreover, as shown in FIG. 7, the transparent electrode 21 may be formed between the first layer 24a and the second layer 24b of the spacer 24. In other words, the transparent electrode 21 may be formed after forming the first layer 24a and then the second layer 24b may be formed so that the spacer 24 is formed of the first layer 24a, the transparent electrode 21, and the second layer 24b laminated in order. In this way, there is an advantage that the spacer 24 need not be formed in the space between the pixel electrodes on the interlayer insulating film 12.

The first layer 24a and the second layer 24b are formed of the colored resins in the above embodiment, but the present invention is not limited to this. For example, it is also possible to use a structure for alignment of the liquid crystal used in MVA (multi-domain vertical alignment) or an insulating film for preventing a leak from the upper and lower substrates as one of the layers of the spacer 24.

As described above, in the present invention, each of the spacers is formed of the first layer and the second layer disposed to cross each other in a plan view. Therefore, even if the first layer or the second layer is displaced slightly from a position where the layer is desired to be formed, the area of the overlap between both the layers is constant to thereby prevent the variations in the column strengths and the unevenness of the gap. Moreover, in comparison with prior-art spacer, the area required by the spacer can be reduced to thereby reduce a loss of the numerical aperture.

What is claimed is:
1. A liquid crystal display device comprising:
  liquid crystal held between a pair of substrates and spacers for keeping a gap between the substrates of the pair provided between the substrates,
  wherein each of the spacers includes a first layer laminated over one of the substrates and a second layer disposed over the first layer to cross the first layer in a plan view; and wherein a first substrate of the pair of substrates is an active substrate and a second substrate of the pair of substrates is a counter substrate, and wherein the first and second layers included in each of the spacers are formed on the counter substrate over at least a part of a black matrix layer so that portions of the first and second layers, in at least a part of areas where the first and second layers do not overlap, are substantially coplanar.

2. A liquid crystal display device according to claim 1, wherein at least one of the layers constituting the spacers is a resin layer.

3. A liquid crystal display device according to claim 1, wherein a color filter layer is provided between the substrates of the pair, and at least one of the layers constituting the spacers is formed when forming the color filter layer.

4. A liquid crystal display device according to claim 1, wherein both of the first layer and second layer are formed by exposure and development, and a length of one of portions extending off an overlap between the first layer and the second layer is set to be equal to or greater than the sum of exposure accuracies and development accuracies of the respective layers.

5. The liquid crystal display device of claim 1, wherein a transparent electrode is formed on each of the spacers and a portion where the transparent electrode is laminated on each of the spacers is in contact with a space between pixel electrodes on the active substrate.

6. A liquid crystal display device comprising:
   liquid crystal held between a pair of substrates and spacers for keeping a gap between the substrates of the pair provided between the substrates;
   wherein each of the spacers includes a first layer laminated over one of the substrates and a second layer disposed over the first layer to cross the first layer in a plan view; and
   wherein a transparent electrode layer is formed between the first layer and the second layer.

7. A liquid crystal display device according to claim 6, wherein at least one of the layers included in the spacers is a resin layer.

8. A liquid crystal display device according to claim 6, wherein a color filter layer is provided between the substrates of the pair, and at least one of the layers included in the spacers is formed when forming the color filter layer.

9. A liquid crystal display device according to claim 6, wherein both of the first layer and second layer are formed by exposure and development, and a length of one of portions extending off an overlap between the first layer and the second layer is set to be equal to or greater than the sum of exposure accuracies and development accuracies of the respective layers.

10. The liquid crystal display device of claim 6, wherein a transparent electrode is formed on each of the spacers and a portion where the transparent electrode is laminated on each of the spacers is in contact with a space between pixel electrodes on the active substrate.

11. A method of manufacturing a liquid crystal display device with spacers for keeping a gap provided between a pair of substrates and liquid crystal held between the substrates, wherein formation of the spacers includes the steps of:
   providing a first layer laminated over one of the substrates;
   providing a second layer disposed over the first layer to cross the first layer in a plan view; and
   wherein a first substrate of the pair of substrates is an active substrate and a second substrate of the pair of substrates is a counter substrate, and wherein the providing of the first and second layers included in at least one of the spacers comprising forming the first and second layers on the counter substrate over at least a part of a black matrix layer so that portions of the first and second layers, in at least a part of areas where the first and second layers do not overlap, are substantially coplanar.

12. A method of manufacturing a liquid crystal display device according to claim 11, wherein at least one of the layers constituting the spacers is a resin layer.

13. A method of manufacturing a liquid crystal display device according to claim 11, wherein the formation of the spacers further includes the step of providing a color filter layer between the substrates of the pair, and at least one of the layers constituting the spacers is formed in the step of forming the color filter layer.

14. A method of manufacturing a liquid crystal display device according to claim 11, wherein both of the first layer and second layer are formed by exposure and development, and a length of one of portions extending off an overlap between the first layer and the second layer is set to be equal to or greater than the sum of exposure accuracies and development accuracies of the respective layers in forming the first and second layers.

15. The method of claim 11, further comprising forming a transparent electrode on each of the spacers, and a portion where the transparent electrode is provided on each of the spacers is in contact with a space between pixel electrodes on the active substrate.

16. A method of manufacturing a liquid crystal display device including spacers for keeping a gap provided between a pair of substrates and liquid crystal held between the substrates, the method comprising forming the spacers including the steps of:
   providing a first layer laminated over one of the substrates;
   providing a second layer disposed over the first layer to cross the first layer in a plan view; and
   wherein the formation of the spacers further includes the step of forming a transparent electrode layer between the step of forming the first layer and the step of forming the second layer.

17. A method of manufacturing a liquid crystal display device according to claim 16, wherein at least one of the layers included in the spacers is a resin layer.

18. A method of manufacturing a liquid crystal display device according to claim 16, wherein the formation of the spacers further includes the step of providing a color filter layer between the substrates of the pair, and at least one of the layers included in the spacers is formed in the step of forming the color filter layer.

19. A method of manufacturing a liquid crystal display device according to claim 16, wherein both of the first layer and second layer are formed by exposure and development, and a length of one of portions extending off an overlap between the first layer and the second layer is set to be equal to or greater than the sum of exposure accuracies and development accuracies of the respective layers in forming the first and second layers.

20. The method of claim 16, further comprising forming a transparent electrode on each of the spacers, and a portion where the transparent electrode is provided on each of the spacers is in contact with a space between pixel electrodes on the active substrate.

* * * * *